United States Patent
Chuzhoy

(10) Patent No.: US 11,900,457 B2
(45) Date of Patent: Feb. 13, 2024

(54) METHODS FOR PREDICTION AND RATING AGGREGATION

(71) Applicant: Leonid Chuzhoy, Glenview, IL (US)

(72) Inventor: Leonid Chuzhoy, Glenview, IL (US)

(*) Notice: Subject to any disclaimer, the term of this patent is extended or adjusted under 35 U.S.C. 154(b) by 96 days.

(21) Appl. No.: 17/401,510

(22) Filed: Aug. 13, 2021

(65) Prior Publication Data

US 2022/0058735 A1     Feb. 24, 2022

Related U.S. Application Data

(60) Provisional application No. 63/069,304, filed on Aug. 24, 2020.

(51) Int. Cl.
*G06Q 40/04* (2012.01)

(52) U.S. Cl.
CPC .................... *G06Q 40/04* (2013.01)

(58) Field of Classification Search
CPC ...................................... G06Q 40/00
USPC ...................................... 705/38, 35
See application file for complete search history.

(56) References Cited

U.S. PATENT DOCUMENTS

| | | | | |
|---|---|---|---|---|
| 5,297,032 A * | 3/1994 | Trojan | ............... | G06Q 40/04 705/37 |
| 5,761,442 A * | 6/1998 | Barr | ............... | G06Q 40/06 705/36 R |
| 5,812,988 A * | 9/1998 | Sandretto | ............... | G06Q 40/00 702/179 |
| 6,009,402 A * | 12/1999 | Whitworth | ............... | G06Q 40/08 705/400 |
| 6,014,645 A * | 1/2000 | Cunningham | ............... | G06Q 40/00 235/379 |
| 6,058,379 A * | 5/2000 | Odom | ............... | G06Q 40/00 705/37 |
| 6,313,833 B1 * | 11/2001 | Knight | ............... | G06Q 40/06 705/37 |
| 6,345,090 B1 * | 2/2002 | Walker | ............... | G06Q 20/403 379/114.03 |
| 6,954,758 B1 * | 10/2005 | O'Flaherty | ............... | G06Q 30/02 707/999.102 |
| 7,165,037 B2 * | 1/2007 | Lazarus | ............... | G06Q 30/0269 705/7.31 |
| 7,376,431 B2 * | 5/2008 | Niedermeyer | ............... | G07C 9/22 379/189 |
| 8,104,678 B2 * | 1/2012 | Yoshikawa | ............... | G06Q 20/4037 235/492 |
| RE43,435 E * | 5/2012 | Krause | ............... | G06Q 40/06 705/37 |
| 8,234,201 B1 * | 7/2012 | Canabarro | ............... | G06Q 40/06 705/36 R |
| 8,412,605 B2 * | 4/2013 | Griffin | ............... | G06Q 40/02 705/76 |
| 8,825,456 B2 * | 9/2014 | Vasudevan | ............... | G06T 7/521 703/2 |

(Continued)

*Primary Examiner* — Kirsten S Apple

(57) ABSTRACT

A method determines forecaster biases based on the correlations between prediction errors made by a group of forecasters. The method measures forecaster skills in different areas of expertise based on the correlations between the absolute values of prediction errors made by a group of forecasters. The method uses bias and skill measurements to raise the precision of aggregate forecasts. The method also reduces bias in social network rating systems by linking the ratings with objectively verifiable predictions.

8 Claims, 3 Drawing Sheets

(56) References Cited

U.S. PATENT DOCUMENTS

| | | | |
|---|---|---|---|
| 9,176,789 B2* | 11/2015 | Lowes | G06F 9/5083 |
| 9,390,144 B2 | 7/2016 | Ciernak | |
| 9,760,910 B1* | 9/2017 | Tuchman | G06Q 50/01 |
| 9,961,039 B2 | 5/2018 | Faller | |
| 10,216,803 B2 | 2/2019 | Ball | |
| 10,593,220 B2 | 3/2020 | Joseph | |
| 10,642,865 B2 | 5/2020 | Goyal | |
| 10,958,211 B1* | 3/2021 | Sarwat | H02J 3/004 |
| 10,977,110 B2* | 4/2021 | Matei | G06N 5/01 |
| 2002/0161677 A1* | 10/2002 | Zumbach | G06Q 40/00 |
| | | | 707/E17.001 |
| 2002/0184134 A1* | 12/2002 | Olsen | G06Q 40/06 |
| | | | 705/37 |
| 2003/0149648 A1* | 8/2003 | Olsen | G06Q 40/00 |
| | | | 705/35 |
| 2005/0187854 A1* | 8/2005 | Cutler | G06Q 40/04 |
| | | | 705/37 |
| 2005/0192899 A1* | 9/2005 | Reardon | G06Q 40/00 |
| | | | 705/40 |
| 2007/0244795 A1* | 10/2007 | Lutnick | G06Q 40/00 |
| | | | 705/37 |
| 2008/0255910 A1* | 10/2008 | Bagchi | G06Q 10/06 |
| | | | 705/7.28 |
| 2008/0288326 A1* | 11/2008 | Abramowicz | G06Q 30/0605 |
| | | | 705/7.29 |
| 2008/0288889 A1* | 11/2008 | Hunt | G06Q 30/02 |
| | | | 715/810 |
| 2008/0301019 A1* | 12/2008 | Monk | G06Q 20/4016 |
| | | | 705/35 |
| 2010/0023460 A1* | 1/2010 | Hughes | G06Q 40/06 |
| | | | 705/36 R |
| 2010/0312701 A1* | 12/2010 | Bosch | G07F 19/20 |
| | | | 705/43 |
| 2011/0047006 A1* | 2/2011 | Attenberg | G06Q 30/0282 |
| | | | 705/347 |
| 2011/0145149 A1* | 6/2011 | Valdes | G06Q 20/28 |
| | | | 705/44 |
| 2011/0178912 A1* | 7/2011 | Parsons | G06Q 40/00 |
| | | | 705/35 |
| 2011/0264581 A1* | 10/2011 | Clyne | G06Q 20/10 |
| | | | 705/39 |
| 2012/0029956 A1* | 2/2012 | Ghosh | G06Q 10/063 |
| | | | 705/7.11 |
| 2012/0030154 A1* | 2/2012 | Nicholson | G01S 13/726 |
| | | | 703/2 |
| 2012/0278254 A1* | 11/2012 | Rosenthal | G06Q 40/06 |
| | | | 705/36 R |
| 2012/0323764 A1* | 12/2012 | Boberski | G06Q 40/04 |
| | | | 705/39 |
| 2013/0226764 A1* | 8/2013 | Battyani | G06Q 40/04 |
| | | | 705/37 |
| 2014/0156491 A1* | 6/2014 | Koh | G06Q 40/04 |
| | | | 705/37 |
| 2014/0229353 A1* | 8/2014 | Lutnick | G06Q 40/04 |
| | | | 705/37 |
| 2015/0154284 A1* | 6/2015 | Pfeifer | G06F 16/3344 |
| | | | 707/723 |
| 2016/0314425 A1* | 10/2016 | Cunningham | G06Q 10/06398 |
| 2018/0047071 A1* | 2/2018 | Hsu | G06Q 30/0282 |
| 2022/0058735 A1* | 2/2022 | Chuzhoy | G06Q 40/04 |

* cited by examiner

METHODS FOR PREDICTION AND RATING AGGREGATION

CROSS-REFERENCE TO RELATED APPLICATIONS

Provisional application No. 63/069,304

STATEMENT REGARDING FEDERALLY SPONSORED RESEARCH OR DEVELOPMENT

Not Applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

FIELD OF INVENTION

The present disclosure relates to a process of deriving maximally accurate data based on information from multiple sources. More specifically, it relates to a process of aggregating predictions and ratings.

BACKGROUND OF THE INVENTION

When multiple forecasters attempt to predict an unknown parameter, the standard technique for deriving an aggregate prediction is to calculate a weighted average of individual predictions, with higher weights given to predictions made by forecasters known for higher accuracy. As long as individual errors are random, the error of the aggregate prediction tends to decrease as the number of forecasters increases. This technique becomes inadequate when a significant fraction of forecasters have a systematic bias (i.e. the tendency for forecast error to be persistent in one direction).

One method of addressing this problem is to ask forecasters to predict the same parameter for different target dates. For example, economic analysts may be repeatedly asked to predict the next month's value of a stock market index in order to determine whether they are systematically biased towards overly optimistic or overly pessimistic predictions. After the analysts' bias has been measured, an appropriate correction can be made in the future aggregate forecasts. By its nature, this approach is unsuitable for questions that cannot be asked more than once. In addition, it can fail on questions involving more than one psychological bias. For example, overly optimistic economic analysts can transition to making overly pessimistic predictions after the political party they oppose wins elections.

An alternative approach is to try reducing forecaster biases, either through personal training or by providing financial incentives for accuracy. Both methods typically achieve limited results even with significant financial investment.

Neither of the existing techniques is applicable to questions that do not have a clear resolution method. For example, evaluating predictions on the effectiveness of competing policy proposals is generally impossible when at most one of the proposals ends up being implemented. Similarly, the existing techniques are not applicable for debiasing subjective estimates.

BRIEF SUMMARY OF THE INVENTION

One aspect of the present invention addresses these and other problems by providing a computer-implemented method based on the analysis of correlations between errors made by different forecasters. The method uses these correlations to calculate a set of parameters for each forecaster describing the strength of the forecaster's biases. Simultaneously, a set of parameters is derived for each question that describes the sensitivity of prediction values to the change in bias values. With forecaster biases and prediction sensitivity to bias being known, it becomes possible to estimate bias-driven errors on any question and make appropriate corrections to aggregate predictions.

Another aspect of the invention is directed to a method for measuring forecaster competence in different areas of expertise based on the analysis of correlations between the absolute magnitudes of errors made by different forecasters. A set of parameters is further derived that describes sensitivity of prediction errors to forecaster competence. With forecaster competence and prediction sensitivity to competence being known, it becomes possible to estimate the magnitude of random errors on any question and make appropriate corrections to aggregate predictions.

Another aspect of the invention is directed to a method for using objectively verifiable predictions to reduce bias effects in the subjective rating systems used by social networks. The method determines user biases by asking them to make predictions of unknown parameters, and then comparing the predictions to the correct values of the parameters. Based on the correlation between user biases and the rating values, it becomes possible to make appropriate corrections to aggregate ratings.

Additional aspects, applications and advantages will become apparent in view of the following description and associated figures.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
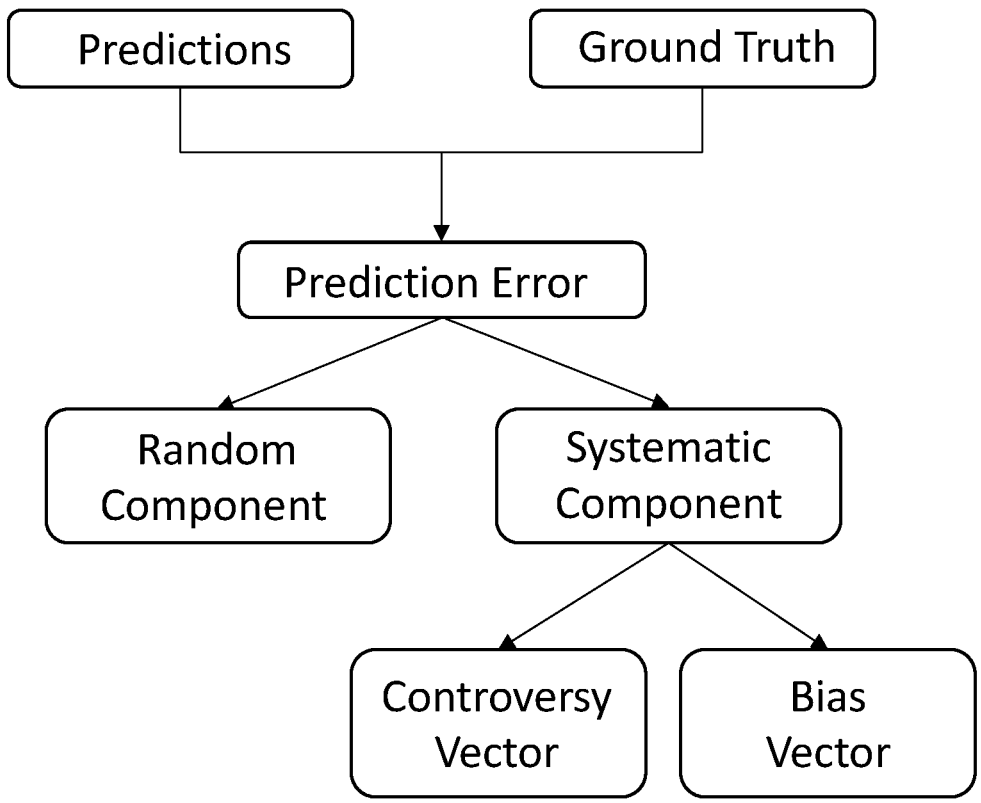
FIG. 1 is a diagram illustrating the method for evaluating forecaster bias.

Common biases of forecasters can be detected and measured by analysing their prediction record, as described in FIG. 1. Comparing predictions to the actual outcomes allows evaluating an error for each prediction. The resulting errors can be decomposed into two parts:

(a) random errors relating to idiosyncratic methods and thought processes of each individual forecaster (the effect of random errors can be mostly eliminated by averaging predictions from a large number of forecasters);

(b) systematic bias-driven errors made by multiple forecasters.

For each question-forecaster pair, the magnitude of the systematic bias-driven error depends on two sets of parameters:

(a) strength and direction of the forecaster's biases;
(b) sensitivity of predictions to forecaster biases for the selected question.

Both sets can be represented as vectors: (a) a bias vector, $\vec{B}$, which measures the strength and direction of forecaster biases; (b) a controversy vector, $\vec{C}$, which for a selected question measures the sensitivity of the predictions to forecaster biases.

Since forecaster biases tend to remain consistent over long periods of time, the errors of forecasters with similar biases are correlated across different questions. Based on these correlations, it is possible to measure the values of both vector sets. In one embodiment, this may be implemented by minimizing a cost function, $S_1$, with respect to $\vec{C}_i$ and $\vec{B}_j$, $$S_1 = \sum_{i,j} |X_i - (x_{i,j} - \vec{C}_i \cdot \vec{B}_j)|^2, \quad (1)$$

where $x_{ij}$ is the prediction for some unknown parameter i made by forecaster j, $X_i$ is the true value of the parameter i, vector $\vec{B}_j$ describes forecaster j biases and vector $\vec{C}_i$ describes predictions' sensitivity to bias for parameter i. The different coordinates of the vectors found by minimization of the cost function correspond to different types of biases that are common among the forecasters. For example, on questions related to politics, main bias axes may correspond to ideological divisions among forecasters (left vs right, libertarian vs authoritarian etc.). After forecasters' bias vectors $\vec{B}_j$ have been found, a debiased aggregate prediction, $X_{agg}$, for any new question whose answer is not yet known can be calculated by minimizing another cost function, $S_2$, with respect to $\vec{C}$ and $X_{agg}$, $$S_2 = \sum_j |X_{agg} - (x_j - \vec{C} \cdot \vec{B}_j)|^2, \quad (2)$$

where $x_j$ is the prediction made by forecaster j and $\vec{C}$ is the predictions' sensitivity to bias for the selected question.

Figure 2:
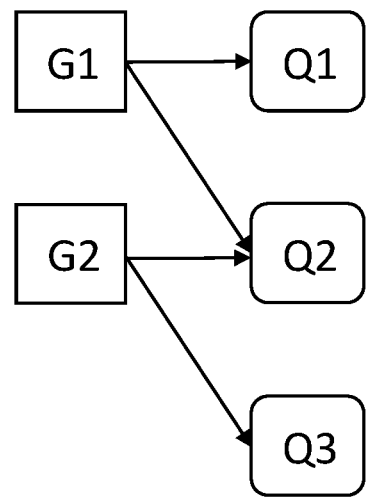
FIG. 2 is a diagram illustrating the method for evaluating bias in the absence of verified predictions.

Another feature of the invention is directed to a method for estimating bias of forecasters whose predictions have not yet been verified. Forecasters and questions are divided into separate sets, as shown in FIG. 2. Set G1 includes forecasters who have made predictions on questions whose answers are already known (set Q1) and whose bias vectors can be calculated directly. Set Q2 includes questions whose answers are not yet known, but for which there exist predictions from forecasters with known biases and for which debiased aggregate predictions can be calculated. Set G2 includes forecasters who have not yet made predictions on questions with known answers (set Q1), but who made predictions on questions with known debiased aggregate predictions (set Q2). For the set G2, it is possible to estimate forecaster biases by comparing individual predictions to the debiased aggregate predictions and treating the differences as proxies for actual forecasting errors. With forecaster biases in the set G2 being thus measured, it becomes possible to debias aggregate predictions for the set of questions Q3 where predictions have been made only by forecasters in the set G2. The debiased aggregate predictions for the set Q3 can be added to the debiased aggregate predictions for the set Q2 to improve the accuracy of bias calculation for the forecasters in the set G2. Similarly, the debiased aggregate predictions for the set Q2 can be combined with the actual outcomes for the questions in the set Q1 to improve the accuracy of bias calculation for the forecasters in the set G1.

In one embodiment, the entire procedure may be implemented by minimizing a single cost function, $S_3$, with respect to $X_{agg,i}$, $\vec{C}_i$ and $\vec{B}_j$, $$S_3 = \sum_{i \in Q, j} |X_{agg,i} - (x_{ij} - \vec{C}_i \cdot \vec{B}_j)|^2 + \lambda_Q \sum_{i \in Q1} |X_{agg,i} - x_i|^2, \quad (3)$$

where Q is a set of all questions and $\lambda_Q$ is a constant.

Another feature of the invention is directed to a method for scoring forecaster accuracy. Forecasting questions can be divided into two categories:

I. Questions where objectively verifiable answers will become available at some future point (e.g., "How many votes will be won by political party X in the next elections?").

II. Questions that do not have an accepted resolution method. For example, such questions may involve hypothetical scenarios (e.g., "What would have been the inflation rate had budget proposal X been accepted?") or assessment of controversial statements (e.g., "What is the probability that claim X is correct?").

For the questions in the second category, forecaster accuracy cannot be directly evaluated by comparing predictions to the actual outcomes. In settings where forecasters compete against each other or where they attempt to meet a set accuracy target, forecasters' motivation to invest a significant effort into obtaining the correct answer is likely to decline, resulting in larger prediction errors. This problem can be mitigated by using a scoring system that evaluates individual predictions according to their proximity to the debiased aggregate predictions in cases where objectively verifiable answers are not available.

Another feature of the invention is directed to a method for reducing bias effects in rating systems used by social networks. The factors that determine ratings of items on social networks may be divided into three categories:

a) quality of the items;
b) subjective preferences of users;
c) objective biases of users.

For example, ratings of comments and articles on social media are based in part on the objective quality characteristics (e.g., factual accuracy), in part on the subjective preferences of users (e.g., the level of personal interest in the topic under discussion) and in part on the user biases (e.g., the tendency to perceive postings that match users' opinions as more accurate).

Figure 3:
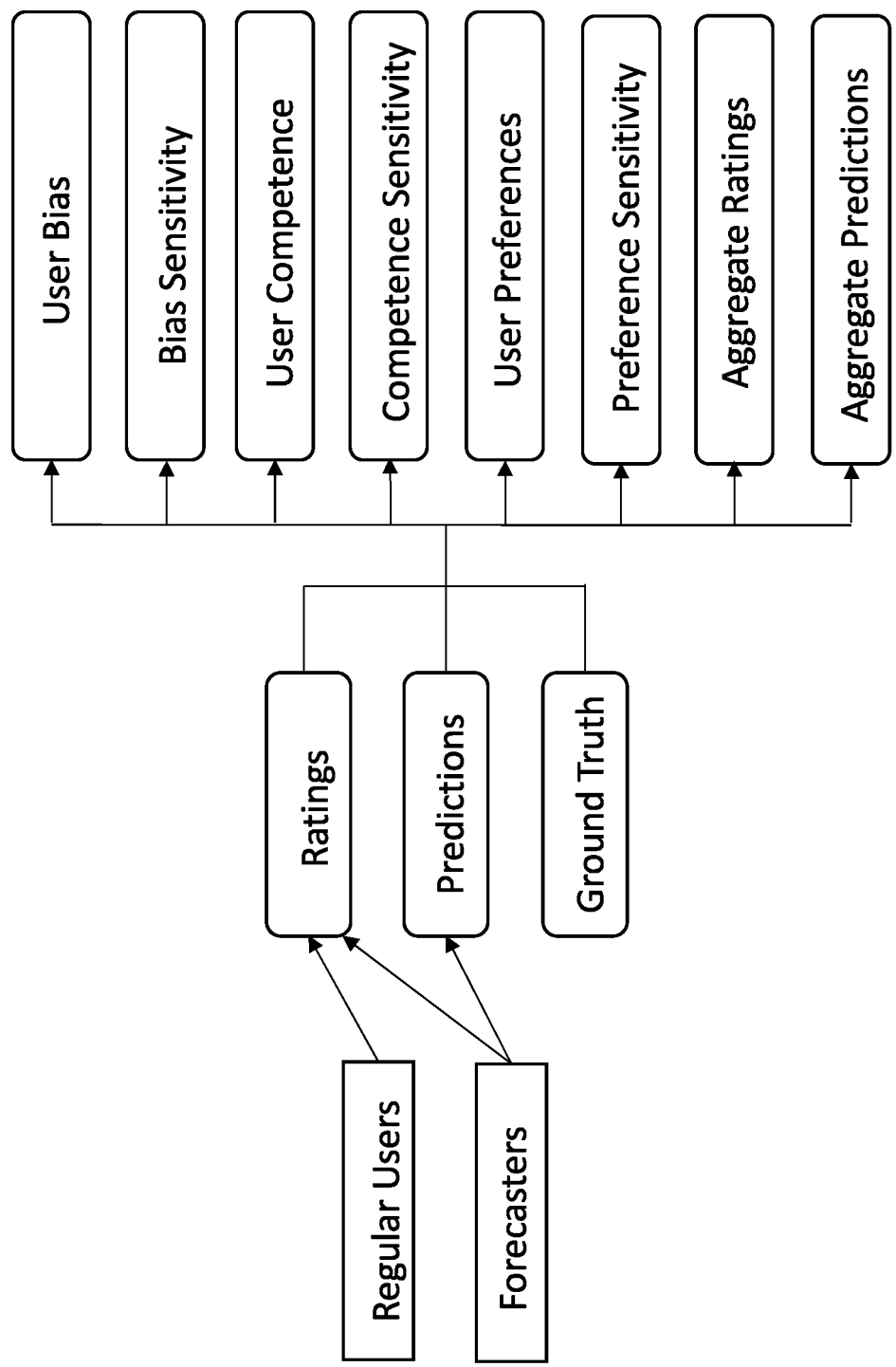
FIG. 3 is a diagram illustrating the method for joint processing of predictions and social network ratings.

In order to distinguish subjective preferences from objective biases, and reduce the effect of the latter on the aggregate ratings of items, the ratings can be linked with objectively verifiable predictions, as shown in FIG. 3. In addition to providing the ratings, a fraction of social network users (forecasters) are requested to make predictions of objectively verifiable parameters. Forecasters' biases are then evaluated by comparing their predictions to the ground truth data. After the forecasters' biases become known, the ratings provided by the forecasters are corrected for bias based on the observed correlations between ratings and biases. Based on the debiased ratings, aggregate ratings are calculated for any items rated by the forecasters. By comparing the ratings provided by regular social network users to the debiased aggregate ratings and treating the differences as proxies for actual prediction errors, biases of the regular users can also be estimated. With the regular users' bias being known, all ratings the users provide can be corrected for bias and debiased aggregate ratings can be calculated for any items they rate, including those that were not directly rated by the forecasters.

In one embodiment, the calculation may be performed by minimizing a cost function, $S_4$, with respect to $X_{agg,i}$, $r_{agg,i}$, $\vec{M}_i$, $\vec{V}_j$, $\vec{C}_i$ and $\vec{B}_j$, $$S_4 = \sum_{i \in Q, j} |X_{agg,i} - (x_{ij} - \vec{C}_i \cdot \vec{B}_j)|^2 + \qquad (4)$$

$$\lambda_r \sum_{i \in R, j} |r_{agg,i} - (r_{ij} - \vec{C}_i \cdot \vec{B}_j - \vec{M}_i \cdot \vec{V}_j)|^2 + \lambda_Q \sum_{i \in Q1} |X_{agg,i} - x_i|^2,$$

where $r_{ij}$ is the rating for item i by user j, R is the set of all rated items, $\vec{V}_j$ is the vector describing subjective preferences of user j, $\vec{M}_i$ is the vector describing the sensitivity of ratings to subjective preferences for item i, $r_{agg,i}$ is the debiased aggregate rating for item i and $\lambda_r$ is a constant.

The linking between verifiable predictions and ratings can be used for constructing collaborative recommendation systems, where items would be scored and ranked based on their debiased aggregate rating, $r_{agg,i}$, and correspondence to personal preferences of users, $\vec{M}_i \cdot \vec{V}_j$ (the simplest approach may be to rank items based on the sum, $r_{agg,i} + \vec{M}_i \cdot \vec{V}_j$, which equals the expected rating of item i by user j corrected for the user's bias). Alternatively, items may be scored and tagged according to the sensitivity of their ratings to bias, $\vec{C}_i$. In the latter case, high absolute values of $\vec{C}_i$ can signal to users potentially problematic items (e.g., media content that contains factual disinformation).

Another feature of the invention is directed to a method for measuring forecaster competence in different fields of expertise. Since the individual performance typically varies across different areas (for example, some forecasters may be consistently better in economic forecasting, others in predicting electoral outcomes, etc.), the optimal results may be obtained by defining forecaster's competence not as a scalar, as is commonly done, but as a vector whose coordinates correspond to competence levels in unrelated areas. The values of the vector can be determined by measuring correlations between the absolute values of prediction errors. In one embodiment this may be implemented by minimizing the cost function, $S_5$, with respect to $\vec{k}_i$ and $\vec{w}_j$, $$S_5 = \frac{\sum_{i,j}(\vec{w}_j \cdot \vec{k}_i)|X_i - x_{ij}|^2}{\sum_{i,j}(\vec{w}_j \cdot \vec{k}_i)}, \qquad (5)$$

where $\vec{w}_j$ measures forecaster j competence and $\vec{k}_i$ measures the sensitivity of prediction errors for question i to forecaster competence.

In an alternative embodiment the method for measuring forecaster competence can be combined with previously described methods of bias mitigation and rating processing. This can be implemented by minimizing the cost function, $S_6$, $$S_6 = \frac{\sum_{i \in Q, j}(\vec{w}_j \cdot \vec{k}_i)|X_{agg,i} - (x_{ij} - \vec{C}_i \cdot \vec{B}_j)|^2}{\sum_{i \in Q, j}(\vec{w}_j \cdot \vec{k}_i)} + \qquad (6)$$

$$\frac{\lambda_r \sum_{i \in R, j}(\vec{w}_j \cdot \vec{k}_i)|r_{agg,i} - (r_{ij} - \vec{C}_i \cdot \vec{B}_j - \vec{M}_i \cdot \vec{V}_j)|^2}{\sum_{i \in R, j}(\vec{w}_j \cdot \vec{k}_i)} ++$$

$$\lambda_Q \sum_{i \in Q1} |X_{agg,i} - x_i|^2,$$

with respect to $X_{agg,i}$, $r_{agg,i}$, $\vec{k}_i$, $\vec{M}_i$, $\vec{V}_j$, $\vec{C}_i$ and $\vec{B}_j$.

Another feature of the invention is directed to a method for using supplementary data to improve the accuracy of the calculations. In some cases, there may exist additional information about forecasters or social network users that is correlated with their competence, bias or personal preferences. Common examples of such information include:

(a) personal characteristics (for example, the education level may be highly predictive for person's competence in some areas of expertise);
(b) ratings of user made items submitted by other users (for example, comments of ideologically biased users are likely to be more highly rated by users with the same bias).

Similarly, there may exist additional information about prediction questions and rated items that is correlated with their aggregate ratings or their sensitivity to competence, bias or personal preferences. Common examples of such information include:

(a) individual characteristics of questions or items (for example, question's topic category may be highly predictive for sensitivity to competence in some areas of expertise);
(b) data on users who produced the items (for example, aggregate ratings for items previously produced by the users may be highly predictive for aggregate ratings of their future items). This additional information can be combined with prediction and rating data to improve the accuracy of the calculations. In one embodiment this may be implemented by adding a regularization term to a cost function, $$\Delta S = \lambda_C \sum_i (\vec{C}_i - <\vec{C}>)^2 + \lambda_M \sum_i (\vec{M}_i - <\vec{M}>)^2 + \qquad (7)$$

$$\lambda_k \sum_i (\vec{k}_i - <\vec{k}>)^2 + +\lambda_B \sum_j (\vec{B}_j - <\vec{B}>)^2 +$$

$$\lambda_V \sum_j (\vec{V}_j - <\vec{V}>)^2 + \lambda_w \sum_j (\vec{w}_j - <\vec{w}>)^2,$$

where $<\vec{C}>$, $<\vec{M}>$, $<\vec{k}>$, $<\vec{B}>$, $<\vec{V}>$ and $<\vec{w}>$ are the average values of vectors $\vec{C}$, $\vec{M}$, $\vec{k}$, $\vec{B}$, $\vec{V}$ and $\vec{w}$, respectively, and $\lambda_C$, $\lambda_M$, $\lambda_k$, $\lambda_B$, $\lambda_V$ and $\lambda_w$ are constants. When additional information is available that allows forecasters and users who provide the ratings to be split into separate groups (for example, by their education levels), the calculation accuracy may be improved by replacing the global averages, $\langle\vec{B}\rangle$, $\langle\vec{V}\rangle$ and $\langle\vec{w}\rangle$, with the average values for each group. Similarly, when questions and rated items can be split into different groups (for example, by topic), the calculation accuracy may be improved by replacing the global averages, $\langle\vec{C}\rangle$, $\langle\vec{k}\rangle$ and $\langle\vec{M}\rangle$, with the average values for each group.

The optimal number of vector dimensions in the above formulas and the optimal values for constants $\lambda_C$, $\lambda_Q$, $\lambda_r$, $\lambda_M$, $\lambda_k$, $\lambda_B$, $\lambda_V$ and $\lambda_w$ can be determined by using the k-fold cross-validation method. The ground truth data for the Q1 question set is randomly divided into k equal size sets. One by one, each set is selected as a test set, to evaluate the accuracy of aggregate predictions for the set against the actual outcomes. Then the constants and the number of dimensions that result in highest average accuracy are selected.

The accuracy of the above methods may be improved by mapping predictions on different questions, $x_{ij}$, into a single normal distribution prior to any further processing. The mapping can be performed using the following procedure: (a) for each parameter i rank all the values of $x_{ij}$ from the largest to the smallest; (b) if a certain value is encountered multiple times use an average rank for each value (for example, if the value 0.5 is encountered 3 times and there 20 values larger than 0.5, use the average rank, 22=(21+22+23)/3); (c) apply the transformation $x_{ij,new}=\sqrt{2}\ \mathrm{erf}^{-1}(2n_{ij}/n_{total,i}-1)$, where $\mathrm{erf}^{-1}$ is the inverse error function, $n_{ij}$ is the prediction $x_{ij}$ rank and $n_{total,i}$ is the total number of predictions made for parameter i. The values of aggregate predictions, $X_{agg,i}$, calculated in the new units can be mapped back into original units by finding the nearest $x_{ij,new}$ values and applying linear interpolation.

All the above methods are not restricted to individual forecasters, but can be applied to any information source, including forecasting teams, public organizations, machines or any group comprising people and machines. Likewise, the methods are not restricted to forecasting information related to the future events and processes, but can also be applied to estimating any parameters whose values are presently unknown or controversial.

It will be clear to one skilled in the art that the above embodiments may be altered in many ways without departing from the scope of the invention. Accordingly, the scope of the invention should be determined by the following claims and their legal equivalents.

What is claimed is:

1. A computer implemented method, comprising: obtaining individual estimates for a set of numerical parameters from a plurality of information sources, wherein an information source may be a person, a group, an organization or any other entity that can provide information; comparing at least some of the estimates to the correct values of at least some of the parameters; decomposing estimate errors into generalized products of two vectors where the first vector measures the biases of the information sources and the second vector measures the sensitivity of the estimates to the biases of the information sources.

2. The method of claim 1, further including: measuring sensitivity of the estimates to the biases of the information sources.

3. The method of claim 2, further including: calculating aggregate estimates for the parameters based on the individual estimates, the biases of the information sources and the sensitivity of the estimates to the biases of the information sources.

4. The method of claim 3, further including: measuring differences between the individual and aggregate estimates for parameters whose correct values are unknown; adjusting the bias values based on the measured differences.

5. The method of claim 3, further including: measuring differences between the individual and aggregate estimates for parameters whose correct values are unknown; using the measured differences to score accuracy of the information sources.

6. The methods of claim 1, further including: obtaining ratings for a plurality of items from a plurality of persons; calculating, based on the ratings and bias values of persons who provided the ratings, aggregate ratings for the items.

7. The method of claim 6, further including: measuring differences between the individual and aggregate ratings; adjusting the bias values of the persons who provided the ratings based on the measured differences.

8. The methods of claim 1, further including: obtaining ratings for a plurality of items from a plurality of persons; scoring person-item pairs based on the ratings and bias values of the persons who provided the ratings.

* * * * *